United States Patent [19]
Kaneko

[11] 4,222,495
[45] Sep. 16, 1980

[54] AUTOMATIC SCREW FEEDING APPARATUS

[75] Inventor: Atsunobu Kaneko, Ayabe, Japan

[73] Assignee: Nitto Seiko Kabushiki Kaisha, Kyoto, Japan

[21] Appl. No.: 32,715

[22] Filed: Apr. 23, 1979

[30] Foreign Application Priority Data

Apr. 24, 1978 [JP] Japan .................................. 53-49086
Apr. 24, 1978 [JP] Japan .................................. 53-49087
Apr. 24, 1978 [JP] Japan .................................. 53-49088

[51] Int. Cl.³ ............................................ B65G 59/06
[52] U.S. Cl. ..................................... 221/68; 221/264; 221/278
[58] Field of Search ................. 221/68, 176, 178, 264, 221/278

[56] References Cited

U.S. PATENT DOCUMENTS

| | | |
|---|---|---|
| 2,540,604 | 2/1951 | Van Sittert et al. ............. 221/278 X |
| 3,061,147 | 10/1962 | Vilmerding ........................ 221/68 X |
| 3,275,191 | 9/1966 | MacDonald ..................... 221/264 X |
| 3,583,599 | 6/1971 | Spisak ..................................... 221/68 |

Primary Examiner—F. J. Bartuska
Attorney, Agent, or Firm—Koda and Androlia

[57] ABSTRACT

An automatic screw feeding apparatus including a body having a groove and a screw inlet formed therein, a screw passing hole intercepting plate provided under the body, a screw distributing member provided in the groove, a screw longitudinal feeding member provided in the groove, a screw lateral feeding member provided in the groove, a top plate provided on the body and an air cylinder for reciprocating the screw lateral feeding member, screw distributing member and screw passing hole intercepting plate.

13 Claims, 10 Drawing Figures

AUTOMATIC SCREW FEEDING APPARATUS

BACKGROUND OF THE INVENTION

1. Field of Invention

The present invention relates to a screw feeding apparatus and more particularly, to a fluid-driven screw feeding apparatus for automatically and separately feeding a plurality of continuously fed screws into power drivers (not shown).

2. Prior Art

Conventionally, previously proposed apparatus of the above described type, for example, in Japanese Pat. No. 44/24831, in which it is so arranged that, while 2 pieces of small screws are supplied into separate power drivers, the piston is brought into sliding movement for moving the screw feeding plate and intercepting plate coupled to said piston so as to cause the small screw at the lowest position on the rails to stand by on the support plate following the movement of the piston, and upon completion of the reciprocation of the piston, said small screw is spontaneously dropped into a vertical hole in the main unit for standing by, with a second small screw being subsequently made to stand by on another support plate, so that, as the piston returns to the original position, said small screw is caused to spontaneously drop into another vertical hole and to stand by in the screw feeding hoses communicated with respective power drivers through the vertical hole formed in the intercepting plate. Upon opening of the electromagnetic valve, compressed air is directed into the hose so as to separately supply the screw standing by in said hose into the power drivers, and simultaneously acts one end face of the piston to drive said piston. However, the screw fed from the rails is held, at its neck portion in two directions, in the U-shaped slit of the screw support plate moving back and forth and confronting the direction of advance of said screw, and during retreatment of said support plate, only the screw strikes against the end face of the screw feeding plate reciprocating at right angles with respect to the advancing direction of the screw so as to be prevented from moving in the horizontal direction for being dropped into the vertical hole of the auxiliary feeding plate. The known arrangement as described in the foregoing, however, has such disadvantages that, since said screw is held from two directions when supported by the screw support plate, the screw itself is not positively driven in the horizontal direction and tends to get out of place before advancing up to the position of said vertical opening, thus distribution of screws not being positively effected. Meanwhile, although the screw is held at its neck portion from two directions by the U-shaped screw support portion provided at the forward end of the support plate, it is so arranged that the screw is prevented from retreating at the forward end of the screw feeding plate so as to be disengaged during retreatment of said support portion, and is spontaneously dropped into the vertical hole at the lower portion, while the upper portion of the vertical hole is not formed into the cylindrical shape, but in the so-called waning circle, which brings about such a problem that smooth dropping of the screws cannot be expected, for example, by the lower edge of the screw head caught by the entrance of the vertical hole. Moreover, the known arrangement as described above gives rise to such an inconvenience that there sometimes arises a case where, after dropping of the two screws into the feeding hose, the screw feeding compressed air is fed into the screw feeding hose immediately before the complete shutting off of said vertical hole by the screw opening intercepting plate, and thus, the compressed air is also direvted upward in the vertical hole so as to blow up the subsequent screws on the support plate upwardly.

SUMMARY OF THE INVENTION

Accordingly, it is a primary object of the present invention to provide an improved screw feeding apparatus in which the neck portion of the screw is held from four directions during holding of the screw so as to positively move the screw while keeping it in the erected state for correct distribution of the screws.

It is another object of the present invention to provide an improved screw feeding apparatus of the above described type in which the vertical hole is formed into a straight cylindrical shape without waning, to give a vertical opening for smooth dropping of the screws.

It is a further object of the present invention to provide an improved screw feeding apparatus of the above described type in which, during feeding of the compressed air into the vertical hole, communication with the upper vertical hole is completely cut off by the intercepting plate.

In keeping with the principles of the present invention, the objects are accomplished by a unique automatic screw feed apparatus which includes a body having a groove and a screw inlet formed therein, a screw passing hole intercepting plate provided under the body, a screw distributing member provided in the groove a screw longitudinally feeding means provided in the groove superjacent the screw distributing member, a screw lateral feeding member provided in the groove superjacent the screw longitudinal feeding member, a top plate provided on the body superjacent the screw lateral feeding member and a reciprocating means for reciprocating the screw lateral feeding member, screw distributing member and the screw passing hole intercepting plate.

DETAILED DESCRIPTION OF THE INVENTION

Referring now to the drawings, one preferred embodiment of the present invention will be described hereinbelow.

Figures 1, 2:
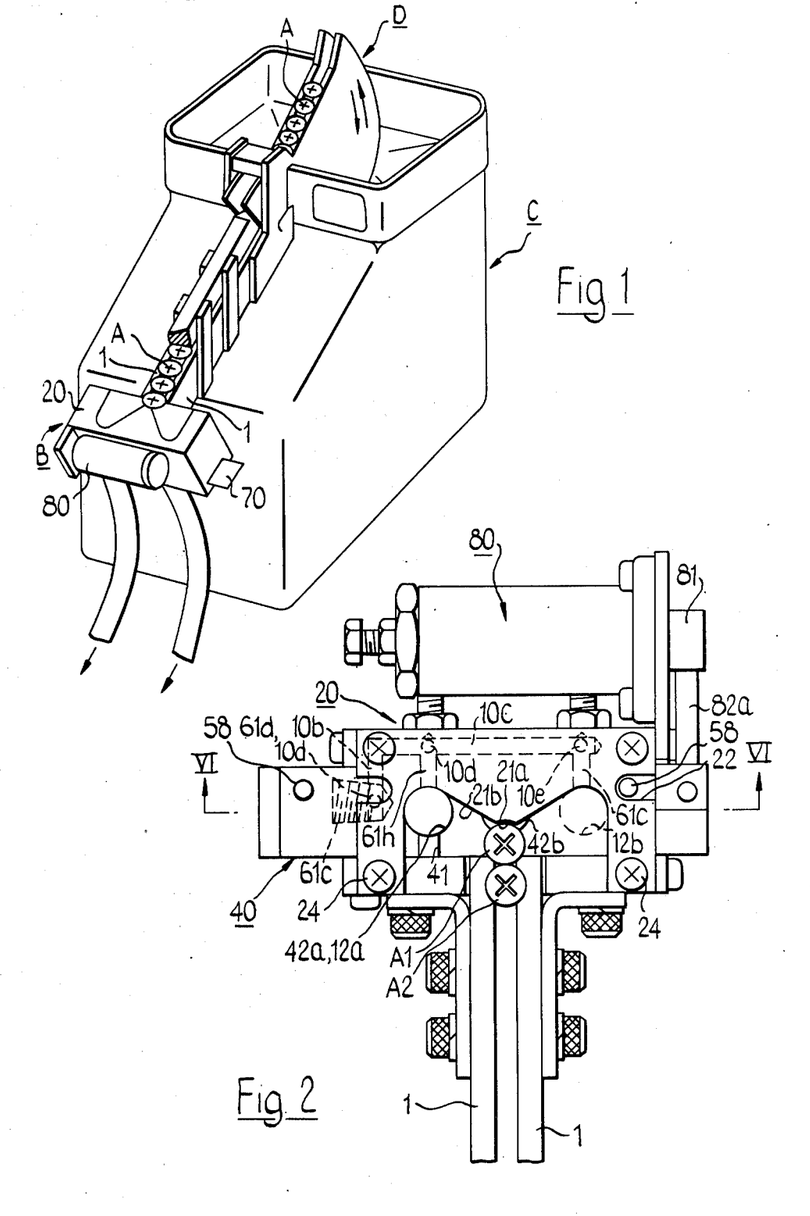
FIG. 1 is a perspective view of an entire apparatus in which one embodiment according to the present invention is incorporated.
FIG. 2 is a top plan view showing one preferred embodiment according to the present invention.

In FIG. 1 showing a perspective view of the whole apparatus including the apparatus according to the present invention, screws A accommodated in a screw hopper C at random orientation are taken out by scooping means D rocking in a vertical place, in the aligned state with their head portions directed upward, and sequentially fed by gravity into the feeding apparatus B of the present invention according to the inclination of rails 1.

As shown in FIGS. 2 through 6, the automatic screw feeding apparatus of the present invention generally includes a top plate 20 and a screw longitudinal feeding member 30 both secured by bolts to the main body 10, a screw lateral feeding member 40, a screw distributing member 50, and a screw passing hole intercepting plate 70 (these three parts are coupled for simultaneous sliding movement with respect to said main body) while inclined rails 1 for supplying screws to said apparatus, an air cylinder 80 for driving the sliding members 40, 50 and 70, a hose mounting member 60 fixed to the lower portion of the main body 10 and an air pipe 20 for supplying the air for feeding screws are further added to said apparatus.

The main body 10 is fundamentally of laterally extending rectangular block-like configuration in which openings, grooves, etc. are formed as described later. More specifically, on the upper surface of the main body, laterally extending guide groove 11 is provided for slidably guiding the screw distribution member mentioned later, and said groove 11 forms a front side wall 11a, a rear side wall 11b and a bottom wall 11c. In the bottom wall 11c of the guide groove 11, two screw passing holes 12a and 12b spaced from each other in the longitudinal direction of the groove, extend through the main body 10 in the vertical direction. Meanwhile, a screw inlet 13 is formed in the rear wall 11b of the guide groove 11 to extend therethrough horizontally and in a direction at right angles to the longitudinal direction of the guide groove 11, and said inlet is formed into rectangular shape to extend through the upper wall of the groove wall 11b at its one edge and to be flush with the bottom wall 11c at its other end as is most clearly seen in FIG. 5. Two stoppers 14 for limiting reciprocating movement of the member 50 are provided to project from the rear wall 11b and bottom wall 11c in spaced relation from each other along the longitudinal direction of the groove and form vertical contact face 14a, a quarter circumferential face 14b having a vertical face at the inner corner portion of the groove 11, and a shoulder portion 14c lower than the upper surface of the rear wall 11b. The shoulder portion 14c is provided with a pin fixing hole 15 directed upward. Meanwhile, the front wall 11a and rear wall 11b have their respective opposite edge portions, with bolt holes 16 directed upward.

The top plate 20 is fixed to the main body 10, with the screw longitudinal feeding member 30, screw lateral feeding member 40 and screw distributing member 50 being held between the top plate 20 and the main body 10 for supporting. In said top plate 20, a screw head guide face 21 is formed for guiding the heads of screws A fed in from the screw inlet 13 with their stems directed downward, and the guide face 21 includes a right angled surface 21a forming a vertical face at right angles with the screw advancing direction and an inclined surface 21b composed of two vertical planes (at the opposite sides of the right angled surface 21a) so inclined as to gradually spaced mutually with respect to the screw advancing direction following symmetrical advance toward said advancing direction. At the opposite ends in the longitudinal direction of the top plate 20, notches 22 are provided so as not to obstruct the reciprocation of a connecting pin 58 extending through the screw lateral feeding member 40 and screw distributing member 50 mentioned later. The main body 10 and top plate 20 are respectively clamped for fixing by bolts 24 and bolt fixing holes 16 and 23.

The screw longitudinal feeding member 30 are secured between the main body 10 and top plate 20 in spaced relation for guiding the stem portions of the screws. In the member 30, there are formed an inlet 31 provided to correspond to said screw inlet 13, a landing 32 corresponding to the right angled face 21a of the top plate 20 and permitting the screws to be temporarily stopped in a position immediately after the screw advancing direction of the inlet 31, two screw paths 33 corresponding the said inclined face 21b of the top plate 20 and formed at opposite sides of the landing 32 between the vertical plane walls in such a manner as to be inclined for gradual spacing mutually toward said advancing direction in symmetrical relation with respect to the screw advancing direction, through holes 34a and 34b extending through in the vertical direction at the ends of said paths, a notch 35 provided so as not to obstruct the movements of the screw lateral feeding member 40 and connecting pin 58 of the screw distributing member 50, and a fixing hole 36 for the pin 17 for fixing the main body 10 and screw longitudinal feeding member 30. The pin 17 is fitted into the opening 15 of the main body 10 for securing.

The screw lateral feeding member 40 is disposed between the top plate 20 and screw longitudinal feeding member 30 for leftward and rightward reciprocating movement with respect to the screw advancing direction, and made of a thin plate of elongated horizontal belt-like shape which direct the screws A fed onto the landing 32 laterally with respect to their advancing direction. The member 40 includes two screw inlets 41 cut along the screw advancing direction, with a lateral interval of ½ of the interval for the main body screw holes 12a and 12b being provided, for holding the stems of the screws A, round dropping holes 42a and 42b provided at ends of said screw inlets 41 for permitting the screws to pass therethrough, and a connecting hole 43 in which a pin 58 is received to be fixed for connection to the screw distributing member 50 mentioned later.

The screw distribution member 50 is slidably accommodated in the guide groove 11 of the main body 10 for being provided between said main body 10 and the screw longitudinal feeding member 30, and is arranged to be reciprocated laterally together with the screw lateral feeding member 40 with respect to the screw feeding rails 1 for distributing the screws A toward the two screw passing holes 12a and 12b at the left and right sides. Therefore, the main body 51 of said member fundamentally has the upper surface of the same shape and dimensions as the screw lateral feeding member 40, and such a thickness that, when the screws $A_1$ and $A_2$ are held by the screw lateral feeding member 40, an under surface lower than the lower end of said screw is provided (see FIG. 6). The screw inlet 511 of said main body 51 corresponds to the screw inlet 41 of said screw lateral feeding member 40, with its central opposite edge faces 50a contacting the stopper contact face 14a of said main body 10. The screw distributing member 50 is provided with dropping holes 51a and 51b at the left and right respectively having vertical axes corresponding to those of said dropping holes 42a and 42b. The main body 51 are cut (cut portion 513) except for a sliding leg portion 514 and a top plate portion 515 for avoiding the stopper 14 of the main body 10, and when the stopping face 50a engages the contact face 14a of the stopper, said quarter circumferential face 14b and dropping holes 51a and 51b are aligned into a concentric relation with each other to form a perfect round hole (see FIG. 7). Adjacent to the opposite edges of said top plate portion 515, elongated openings 512 along the sliding direction are formed for receiving therein pins 17. From one end of the sliding leg portion 514, an intercepting plate connecting portion 52 extends, in which a vertical hole 52a for receiving a vertical connecting pin for connecting the intercepting plate 70 mentioned later.

To the under surface of the main body 10, the hose attaching member 60 is mounted holding a screw dropping intercepting plate 70. The member 60 includes a main body 61 of generally rectangular block-like shape and left and right hose fittings 62a and 62b which are fitted for fixing into concentric hose attaching holes 61a and 61b which are formed in the main body 61 and correspond to the screw passing holes 12a and 12b of the main unit 10. Meanwhile, at the outer peripheries of said hose fittings 62a and 62b, concave grooves 63 are formed, from which a plurality of air outlets 65 are provided to be directed downward slantwise with respect to the left and right screw passing holes 64a and 64b.

In the under surface of the main body 10, there is formed an intercepting plate sliding groove 18 for slidably guiding the intercepting plate 70 mentioned later so as to extend lengthwise in the form of a belt along the reciprocating direction of the screw distributing member 50, including the screw passing holes 12a and 12b. In the groove 18, a screw dropping hole intercepting plate 70 of belt-like shape is received for making it possible to effect horizontal reciprocating movement in synchronization with said screw distributing member 50 by coupling with said intercepting plate connection portion 52 through a vertical connecting rod 82b. The intercepting plate 70 is formed with two screw passing holes 71a and 71b provided at an interval equal to the screw passing hole 12 of the main unit 10 and dropping hole 34 of the screw longitudinal feeding member 30, and an air vent 72 which is communicated, when said intercepting plate 70 cuts off the communication between the screw passing hole 12 of the main body 10 and the screw passing hole 64 of the hose fitting 62 fitted into the hose attaching member 60 for fixing.

The air piston cylinder mechanism 80 is disposed at the rear face of the device main unit 10, and simultaneously drives the screw distributing member 50, screw lateral feeding member 40 and screw dropping hole intercepting plate 70 for sliding movement through the horizontal connecting rod 82a and vertical connecting rod 82b.

Figure 3:
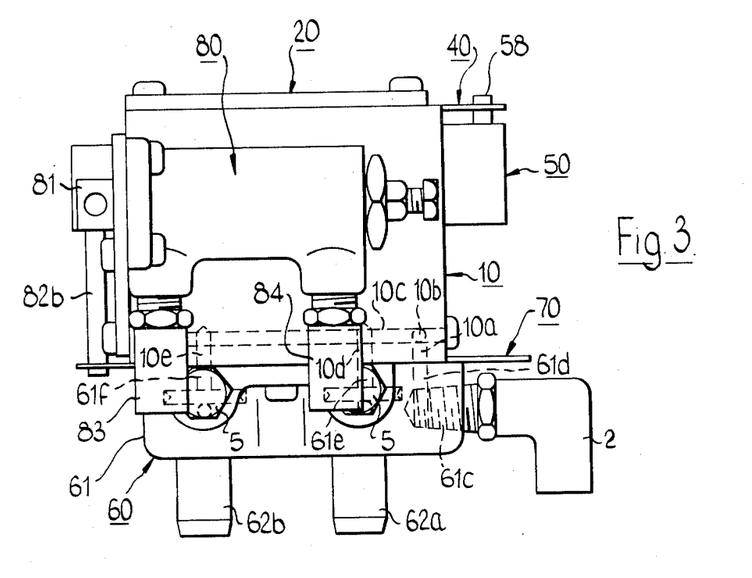
FIG. 3 is a rear view of the apparatus of FIG. 2.
Figure 4:
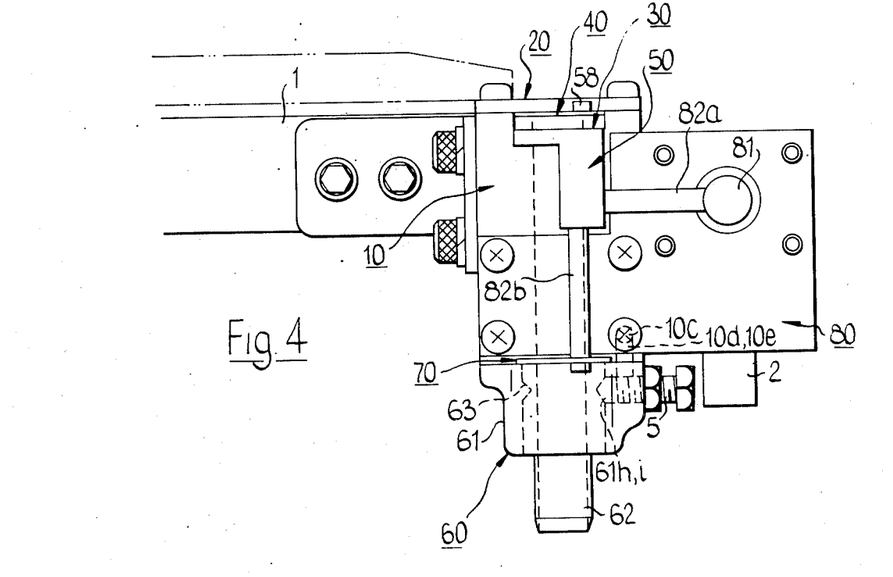
FIG. 4 is a right side view of the apparatus of FIG. 2.
Figure 5:
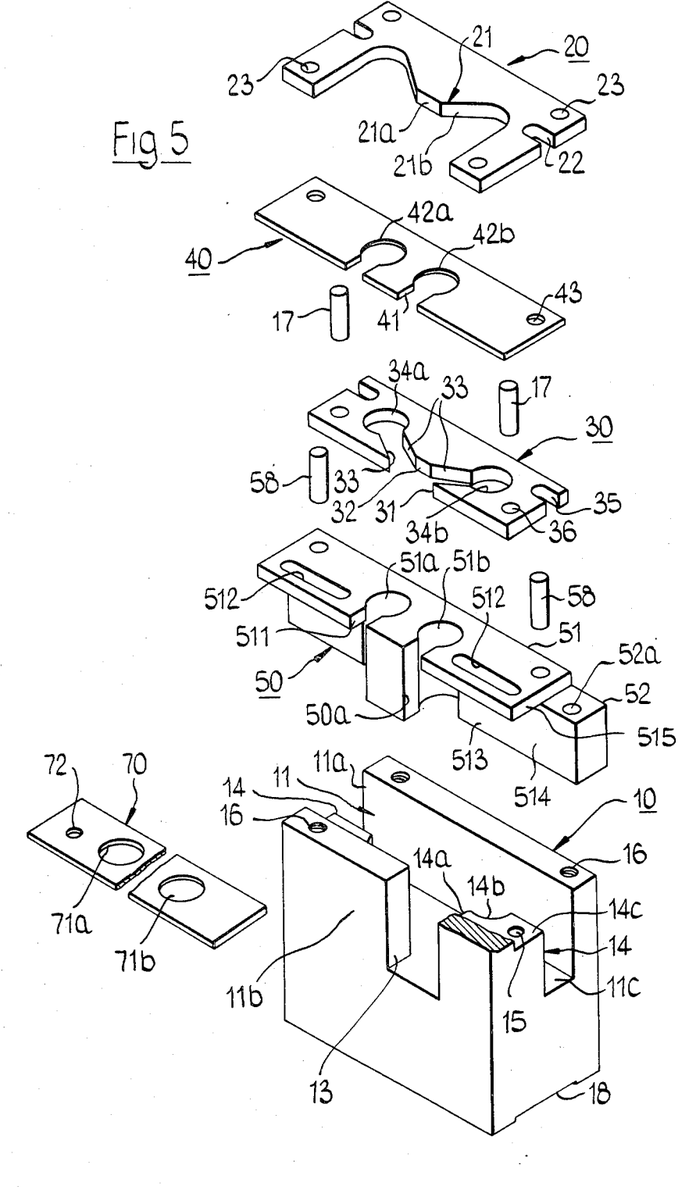
FIG. 5 is an exploded perspective view of a main portion of the apparatus of FIG. 2.
Figures 8, 9, 10:
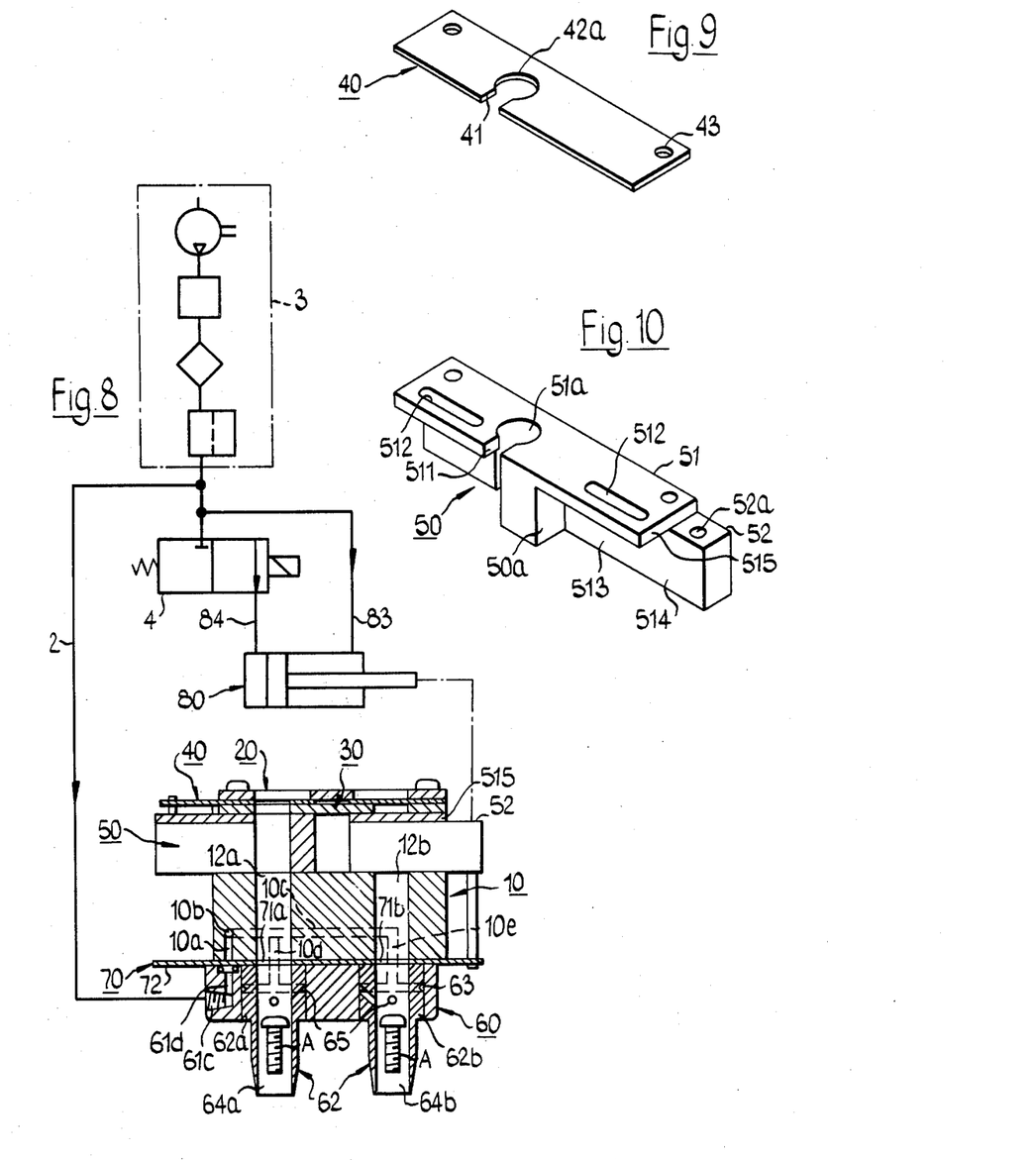
FIG. 8 is a diagram showing an air system coupled to the apparatus of the present invention.
FIGS. 9 and 10 are perspective views respectively showing important portions according to modifications of the present invention.

The air piston cylinder mechanism 80 includes a piston rod 81, and two air pipes 83 and 84 at the left and right for introduction and discharging of the compressed air, and during non-operation, the compressed air is introduced through the pipe 83 as shown in FIGS. 2, 3 and 8 for maintaining the piston in a position of normal state (FIG. 2 at the left, FIG. 3 at the right).

Figure 6:
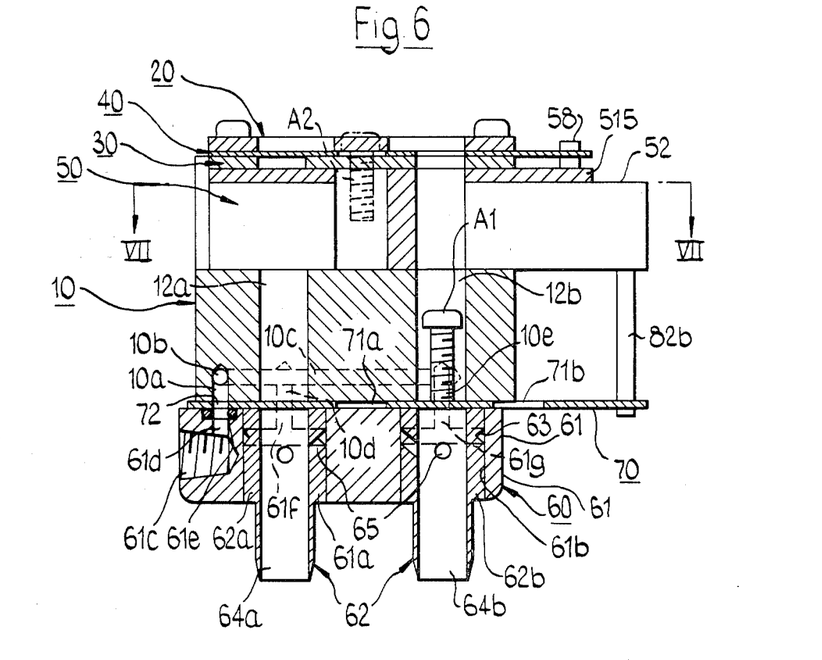
FIG. 6 is a cross-sectional view taken along the line VI—VI of FIG. 2 showing the piston actuated toward the right.
Figure 7:
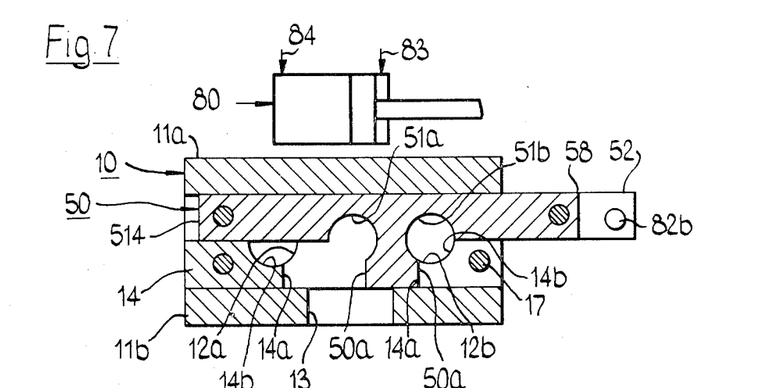
FIG. 7 is a cross-sectional view taken along the line VII—VII of FIG. 6.

In FIG. 8, the air fed under pressure by the compressed air feeding unit 3 passes through a solenoid valve 4 actuated by an instruction device (not shown). For air passages corresponding to the above, there are formed as shown in FIGS. 2, 6 and 8, an inlet 61c, a rising passage 61d communicating therewith, an air vent 72 extending through the intercepting plate 70 through a packing 61e, and further, a rising passage 10a formed in the main body 10, horizontal passages 10b and 10c directed back and forth and laterally, and falling passages 10d and 10e, and falling passage 61f and 61g branched and falling along two screw passing holes 64a and 64b, and also horizontal passages 61h and 61i for communication with the concave grooves 63 provided around the peripheries of the hose fittings 62. The falling passages 61f and 61g are provided with compressed air adjusting plugs 5.

The screw supplying rails 1 includes rail members at the right and left, and is inclined downwardly toward the advancing direction for making it possible to continuously supply many screws by holding the neck portions of the screws A with their head portions directed upward. The rails 1 are fixed in such a manner that they confront the right angled face 21a of the top plate 20, with their central axes being aligned with each other.

Apart from the above embodiment, the air piston cylinder 80 may be modified to be directly coupled respectively to the screw lateral feeding member 40, screw distributing member 50 and screw dropping hole intercepting plate 70.

By the above arrangement, function of the above described apparatus will be explained hereinbelow.

The screws $A_1, A_2 \ldots A_n$ arranged on the rails 1 in the aligned state advance toward the screw head guiding right angled face 21a of the top plate 20. During the normal state where the piston cylinder mechanism 80 is not functioning, the screw distributing member 50 and screw lateral feeding member 40 are located in positions deviated to the uttermost left as shown in FIG. 2. Therefore, the leading screw $A_1$ advances up to the screw inlet 41 toward the dropping hole 42b at the right of the screw lateral feeding member 40 contacting said rails 1. Upon actuation of the solenoid valve 4 by the instruction, the piston is moved to the right side. Accordingly the screw $A_1$ is pushed by the screw inlet cut face 41 under a state stably held from four sides, and simultaneously moves rightward along the wall surface of the passage 33 of the screw longitudinal feeding member 30 for reaching the dropping hole 34a at the right side. In the above case, the right side stopping surface 50a of the screw distributing member 50 contacts the stopper contacting surface 14a of the device main body 10, and thus, the right side dropping hole 51b of the screw distributing member 50 is made into a straight cylindrical hole without waning, through which the screw $A_1$ falls smoothly. However, in the above state, since the dropping holes 51b and screw passing hole 64b of the hose attaching portion 60 at the lower portion are cut off by the screw dropping hole intercepting plate 70 of the device main body 10, said screw $A_1$ is temporarily stopped on the intercepting plate 70 (see FIG. 6).

Although the series of operation as described above is carried out in an extremely short period of time, the subsequent screw $A_2$ advances up to the screw head guiding right angled surface 21a of the top plate 20 during the above time in the similar manner as before so as to be in contact with said surface. Accordingly, as in FIG. 8, by the functioning of the solenoid valve 4 in the reverse direction, the piston is returned to the nonfunctioning state described earlier. By the above, the screw distributing member 50, screw lateral feeding membr 40 and screw dropping hole intercepting plate 70 are moved toward the left in FIG. 1, and thus, similar function as before is imported to the screw $A_2$, while the screw passing hole 12a at the left is made into the straight cylindrical shape as shown. Furthermore, since both of the left and right screw passing holes 71a and 71b of the screw dropping hole intercepting plate 70 are set to be communicated with the screw passing holes 12a and 12b, the screw $A_2$ is dropped through said hole 12a, and simultaneously, the screw $A_1$ temporarily stopped as described earlier is also dropped into the screw passing hole 64b at the right side.

Accordingly, the air vent 72 of the screw dropping hole intercepting plate 70 causes the rising passage 61d to be communicated with the rising passage 10a during functioning of the piston (when the distributing member 50 is moved to the right), while on the other hand, since the screw passages 12a and 12b are cut off, the compressed air is discharged from each of the air vents 65 and feeds the screws $A_1$ and $A_2$ located in the screw passing holes 64a and 64b downward under pressure so as to be transported to the predetermined position by air through a hose (not shown).

It is to be noted here that in the above embodiment, although the description is made with reference to the apparatus which supplies two screws into separate systems per one cycle, the apparatus may be modified to supply one price of screw per one cycle, if the screw inlet at one side is clogged. In other words, as shown in FIGS. 9 and 10, one of the screw dropping holes 42 of the screw lateral feeding member 40 and also one of the screw dropping holes 51 of the screw distributing member 50 can be omitted. In the above case, the screw passing hole 12, inclined surface 21 and dropping opening 34 of the apparatus main body 10, top plate 20 and screw longitudinal feeding member 30 may be left as they are or clogged only in one side at the left or right.

As is clear from the foregoing description, according to the present invention, since it is so arranged that the screw is held at the neck portion from four directions for positive movement of the screw in the erected state, the distribution of screws is positively effected so that the screws are dropped and supplied into the vertical hole in the correct attitude.

It is further to be noted that owing to the arrangement of the invention the compressed air is supplied after complete closing of the intercepting plate, the screws are not blown upward in the vertical hole by the compressed air for screw feeding, thus being smoothly fed downward to the lower portion of the vertical hole.

Furthermore, elimination of the waning portion in the vertical hole has made it possible for the screws to be spontaneously dropped smoothly in the correct attitude without being caught at the inlet of the vertical hole or surrounding walls on the way.

What is claimed is:

1. An automatic screw feeding apparatus for feeding continuously entering screws toward systems displaced from the position of said entering which comprises:

a main body provided with guide groove having a horizontal bottom wall extending in lateral and horizontal direction with respect to the entering direction of the screws, said bottom wall being formed with a screw passing hole extending therethrough in a vertical direction;

a screw longitudinal feeding member provided on the upper side of said main body, and moving and guiding the entering screws in a longitudinal direction approximately parallel to the entering direction of the screws up to a position directly above said screw passing hole of said main body;

a screw lateral feeding member provided on the upper side of said screw longitudinal feeding member, and moving and guiding the entering screws up to the position directly above said screw passing hole of said main body through reciprocation in the lateral and horizontal direction; and a screw distributing member slidably accommodated in said guide groove of said main body to be disposed between it and said screw longitudinal feeding member for lateral reciprocating movement together with said screw lateral feeding member, and provided with screw dropping hole so arranged as to guide the screws moved by said screw feeding member toward said screw passing hole of said main body, said screw longitudinal feeding member is provided with a screw inlet which guides stem portions of the entering screws in the longitudinal direction, a passage communicated with said screw inlet and inclined with respect to the entering direction of the screws, and a screw dropping hole extending therethrough in the vertical direction to correspond to said screw dropping hole of said main body at the end portion of said passage, said screw lateral feeding member being provided with a screw inlet extending therethrough so as to guide the stem portions of the entering screws in the longitudinal direction and a screw dropping hole extending therethrough in the vertical direction at the end portion of said screw inlet.

2. An automatic screw feeding apparatus for feeding continuously entering screws toward systems displaced from the position of said entering which comprises:

a main body provided with guide groove having a horizontal bottom wall extending in lateral and horizontal direction with respect to the entering direction of the screws, said bottom wall being formed with a screw passing hole extending therethrough in a vertical direction;

a screw longitudinal feeding member provided on the upper side of said main body, and moving and guiding the entering screws in a longitudinal direction approximately parallel to the entering direction of the screws up to a position directly above said screw passing hole of said main body;

a screw lateral feeding member provided on the upper side of said screw longitudinal feeding member, and moving and guiding the entering screws up to the position directly above said screw passing hole of said main body through reciprocation in the lateral and horizontal direction; and a screw distributing member slidably accommodated in said guide groove of said main body to be disposed between it and said screw longitudinal feeding member for lateral reciprocating movement together with said screw lateral feeding member, and provided with screw dropping hole so arranged as guide the screws moved by said screw feeding member toward said screw passing hole of said main body;

a stopper member having a divided circumferential surface flash with said screw passing hole is provided to extend along a rear wall and a bottom wall in a guide groove of said main body, said screw distributing member including a main body having a screw inlet and a screw dropping hole substantially similar to said screw inlet and screw dropping hole of said screw lateral feeding member, said main body being set in its height so as to be located in a position higher than the lower surface of said main body at the lower end of the screw when said screw is held by said screw lateral feeding member, with cut portion being provided excluding a sliding leg portion and a top plate portion so as to avoid said stopper during reciprocation of said screw distributing member, thereby when the end face of said screw inlet left by said cut portion contacts said stopper during the reciprocating movement, said screw dropping hole of said screw distributing member and said divided circumferential surface of said stopper are brought into alignment to form a perfectly round opening.

3. An automatic screw feeding apparatus for feeding continuously entering screws toward systems displaced from the position of said entering which comprises:

a main body provided with guide groove having a horizontal bottom wall extending in lateral and horizontal direction with respect to the entering direction of the screws, said bottom wall being formed with a screw passing hole extending therethrough in a vertical direction;

a screw longitudinal feeding member provided on the upper side of said main body, and moving and guiding the entering screws in a longitudinal direction approximately parallel to the entering direction of the screws up to a position directly above said screw passing hole of said main body;

a screw lateral feeding member provided on the upper side of said screw longitudinal feeding member, and moving and guiding the entering screws up to the position directly above said screw passing hole of said main body through reciprocation in the lateral and horizontal direction; and a screw distributing member slidably accommodated in said guide groove of said main body to be disposed between it and said screw longitudinal feeding member for lateral reciprocating movement together with said screw lateral feeding member, and provided with screw dropping hole so arranged as to guide the screws moved by said screw feeding member toward said screw passing hole of said main body;

a screw dropping hole intercepting plate to be reciprocated in the lateral direction integrally with said screw distributing member and having a horizontal belt-like shape in said lateral direction, said screw dropping hole intercepting plate being provided with a screw passing hole which is aligned with the screw passing hole of the main body so as to cut off or fully open said screw passing hole of said main body at either one or the other end stopping position and also being provided with an air vent for supplying compressed air into a screw feeding hose when said intercepting plate completely cuts off said screw hole of said main body, an air passage being provided in said main body to correspond to said air vent in the stopping position of said intercepting plate for supplying the compressed air during supplying of said compressed air, and also a connecting rod which reciprocates said screw distributing member and screw dropping hole intercepting plate as one unit.

4. An automatic screw feeding apparatus for feeding continuously entering screws toward systems displaced from the position of said entering which comprises:

a main body provided with guide groove having a a horizontal bottom wall extending in lateral and horizontal direction with respect to the entering direction of the screws, said bottom wall being formed with a screw passing hole extending therethrough in a vertical direction;

a screw longitudinal feeding member provided on the upper side of said main body, and moving and guiding the entering screws in a longitudinal direction approximately parallel to the entering direction of the screws up to a position directly above said screw passing hole of said main body;

a screw lateral feeding member provided on the upper side of said screw longitudinal feeding member, and moving and guiding the entering screws up to the position directly above said screw passing hole of said main body through reciprocation in the lateral and horizontal direction; and a screw distributing member slidably accommodated in said guide groove of said main body to be disposed between it and said screw longitudinal feeding member for lateral reciprocating movement together with said screw lateral feeding member, and provided with screw dropping hole so arranged as to guide the screws moved by said screw feeding member toward said screw passing hole of said main body, said screw longitudinal feeding member is provided with a screw inlet which guides stem portions of the entering screws in the longitudinal direction, a passage communicated with said screw inlet and inclined with respect to the entering direction of the screws, and a screw dropping hole extending therethrough in the vertical direction to correspond to said screw dropping hole of said main body at the end portion of said passage, said screw lateral feeding member being provided with a screw inlet extending therethrough so as to guide the stem portions of the entering screws in the longitudinal direction and a screw dropping hole extending therethrough in the vertical direction at the end portion of said screw inlet, a stopper member having a divided circumferential surface flush with said screw passing hole is provided to extend along a rear wall and a bottom wall in a guide groove of said main body, said screw distributing member including a main body having a screw inlet and a screw dropping hole substantially similar to said screw inlet and screw dropping hole of said screw lateral feeding member, said main body being set in its height so as to be located in a position higher than the lower surface of said main body at the lower end of the screw when said screw is held by said screw lateral feeding member, with cut portion being provided excluding a sliding leg portion and a top plate portion so as to avoid said stopper during reciprocation of said screw distributing member, thereby when the end face of said screw inlet left by said cut portion contacts said stopper during the reciprocating movement, said screw dropping hole of said screw distributing member and said divided circumferential surface of said stopper are brought into alignment to form a perfectly round opening.

5. An automatic screw feeding apparatus for feeding continuously entering screws toward systems displaced from the position of said entering which comprises:

a main body provided with guide groove having a horizontal bottom wall extending in lateral and horizontal direction with respect to the entering direction of the screws, said bottom wall being formed with a screw passing hole extending therethrough in a vertical direction;

a screw longitudinal feeding member provided on the upper side of said main body, and moving and guiding and entering screws in a longitudinal direction approximately parallel to the entering direction of the screws up to a position directly above said screw passing hole of said main body;

a screw lateral feeding member provided on the upper side of said screw longitudinal feeding member, and moving and guiding the entering screws up to the position directly above said screw passing hole of said main body through reciprocation in the lateral and horizontal direction; and a screw distributing member slidably accommodated in said guide groove of said main body to be disposed between it and said screw longitudinal feeding member for lateral reciprocating movement together with said screw lateral feeding member, and provided with screw dropping hole so arranged so as to guide the screws moved by said screw feeding member toward said screw passing hole of said main body, said screw longitudinal feeding member is provided with a screw inlet which guides stem portions of the entering screws in the longitudinal direction, a passage communicated with said screw inlet and inclined with respect to the entering direction of the screws, and a screw dropping hole extending therethrough in the vertical direction to correspond to said screw dropping hole of said main body at the end portion of said passage, said screw lateral feeding member being provided with a screw inlet extending therethrough so as to guide the stem portions of the entering screws in the longitudinal direction and a screw dropping hole extending therethrough in the vertical direction at the end portion of said screw inlet, a screw dropping hole intercepting plate to be reciprocated in the lateral direction integrally with said screw distributing member and having a horizontal belt-like shape in said lateral direction, said screw dropping hole intercepting plate being provided with a screw passing hole which is aligned with the screw passing hole of the main body so as to cut off or fully open said screw passing hole of said main body at either one or the other end stopping position and also being provided with an air vent for supplying compressed air into a screw feeding hose when said intercepting plate completely cuts off said screw hole of said main body, an air passage being provided in said main body to correspond to said air vent in the stopping position of said intercepting plate for supplying the compressed air during supplying of said compressed air, and also, a connecting rod which reciprocates said screw distributing member and screw dropping hole intercepting plate as one unit.

6. An automatic screw feeding apparatus for feeding continuously entering screws toward systems displaced from the position of said entering which comprises:

a main body provided with guide groove having a horizontal bottom wall extending in lateral and horizontal direction with respect to the entering direction of the screws, said bottom wall being formed with a screw passing hole extending therethrough in a vertical direction;

a screw longitudinal feeding member provided on the upper side of said main body, and moving and guiding the entering screws in a longitudinal direction approximately parallel to the entering direction of the screws up to a position directly above said screw passing hole of said main body;

a screw lateral feeding member provided on the upper side of said screw longitudinal feeding member, and moving and guiding the entering screws up to the position directly above said screw passing hole of said main body through reciprocation in the lateral and horizontal direction; and a screw distributing member slidably accommodated in said guide groove of said main body to be disposed between it and said screw longitudinal feeding member for lateral reciprocating movement together with said screw lateral feeding member, and provided with screw dropping hole so arranged as to guide the screws moved by said screw feeding member toward said screw passing hole of said main body, a stopper member having a divided circumferential surface flush with said screw passing hole is provided to extend along a rear wall and a bottom wall in a guide groove of said main body, said screw distributing member including a main body having a screw inlet and a screw dropping hole substantially similar to said screw inlet and screw dropping hole of said screw lateral feeding member, said main body being set in its height so as to be located in a position higher than the lower surface of said main body at the lower end of the screw when said screw is held by said screw lateral feeding member, with cut portion being provided excluding a sliding leg portion and a top plate portion so as to avoid said stopper during reciprocation of said screw distributing member, thereby when the end face of said screw inlet left by said cut portion contacts said stopper during the reciprocating movement, said screw dropping hole of said screw distributing member and said divided circumferential surface of said stopper are brought into alignment to form a perfectly round opening, a screw dropping hole intercepting plate to be reciprocated in the lateral direction integrally with said screw distributing member and having a horizontal belt-like shape in said lateral direction, said screw dropping hole intercepting plate being provided with a screw passing hole which is aligned with the screw passing hole of the main body so as to cut off or fully open said screw passing hole of said main body at either one or the other end stopping position and also being provided with an air vent for supplying compressed air into a screw feeding hose when said intercepting plate completely cuts off said screw hole of said main body, an air passage being provided in said main body to correspond to said air vent in the stopping position of said intercepting plate for supplying the compressed air during supplying of said compressed air, and also a connecting rod which reciprocates said screw distributing member and screw dropping hole intercepting plate as one unit.

7. An automatic screw feeding apparatus for feeding continuously entering screws toward systems displaced from the position of said entering which comprises:

a main body provided with guide groove having a horizontal bottom wall extending in lateral and horizontal direction with respect to the entering direction of the screws, said bottom wall being formed with a screw passing hole extending therethrough in a vertical direction;

a screw longitudinal feeding member provided on the upper side of said main body, and moving and guiding the entering screws in a longitudinal direction approximately parallel to the entering direction of the screws up to a position directly above said screw passing hole of said main body;

a screw lateral feeding member provided on the upper side of said screw longitudinal feeding member, and moving and guiding the entering screws up to the position directly above said screw passing hole of said main body through reciprocation in the lateral and horizontal direction; and a screw distributing member slidably accommodated in said guide groove of said main body to be disposed between it and said screw longitudinal feeding member for lateral reciprocating movement together with said screw lateral feeding member, and provided with screw dropping hole so arranged as to guide the screws moved by said screw feeding member toward said screw passing hole of said main body, said screw longitudinal feeding member is provided with a screw inlet which guides stem portions of the entering screws in the longitudinal direction, a passage communicated with said screw inlet and inclined with respect to the entering direction of the screws, and a screw dropping hole extending therethrough in the vertical direction to correspond to said screw dropping hole of said main body at the end portion of said passage, said screw lateral feeding member being provided with a screw inlet extending therethrough so as to guide the stem portions of the entering screws in the longitudinal direction and a screw dropping hole extending therethrough in the vertical direction at the end portion of said screw inlet, a stopper member having a divided circumferential surface flush with said screw passing hole is provided to extend along a rear wall and a bottom wall in a guide groove of said main body, said screw distributing member including a main body having a screw inlet and a screw dropping hole substantially similar to said screw inlet and screw dropping hole of said screw lateral feeding member, said main body being set in its height so as to be located in a position higher than the lower surface of said main body at the lower end of the screw when said screw is held by said screw lateral feeding member, with cut portion being provided excluding a sliding leg portion and a top plate portion so as to avoid said stopper during reciprocation of said screw distributing member, thereby when the end face of said screw inlet left by said cut portion contacts said stopper during the reciprocating movement, said screw dropping hole of said screw distributing member and said divided circumferential surface of said stopper are brought into alignment to form a perfectly round opening, a screw dropping hole intercepting plate to be reciprocated in the lateral direction integrally with said screw distributing member and having a horizontal belt-like shape in said lateral direction, said screw dropping hole intercepting plate being provided with a screw passing hole which is aligned with the screw passing hole of the main body so as to cut off or fully open said screw passing hole of said main body at either one or the other end stopping position and also being provided with an air vent for supplying compressed air into a screw feeding hose when said intercepting plate completely cuts off said screw hole of said main body, an air passage being provided in said main body to correspond to said air vent in the stopping position of said intercepting plate for supplying the compressed air during supplying of said compressed air, and also a connecting rod which reciprocates said screw distributing member and screw dropping hole intercepting plate as one unit.

8. An automatic screw feeding apparatus for feeding continuously entering screws toward separate systems by two pieces per one cycle as claimed in any one of claims 1-7 wherein said screw passing hole of said main body are provided in two at an interval in the longitudinal direction of the groove in a bottom wall of said main body, with two screw dropping holes being provided in said distributing member, said screw dropping hole intercepting plate being formed with two screw passing holes corresponding to said screw passing holes of said main body.

9. An automatic screw feeding apparatus for feeding continuously entering screws by one piece per one cycle as claimed in any one of the above claims 1-7, wherein said screw lateral feeding member is provided with one each of screw inlet and screw dropping hole, with said screw distributing member being formed with one screw dropping hole.

10. An automatic screw feeding apparatus as claimed in any one of claims 1-7, wherein a screw inlet is formed in the rear wall of the guide groove to extend therethrough horizontally and in a direction at right angles to the longitudinal direction of the guide groove and said inlet is formed into rectangular shape to extend through the upper face of the groove wall at its one edge.

11. An automatic screw feeding apparatus as claimed in any one of claims 1-7, wherein a top plate is fixed to the main body, in said top plate a screw head guide face is formed for guiding the heads of screws fed in from the screw inlet with their stems directed downward, and the guide face includes a right angles surface forming a vertical face at right angles with the screw advancing direction and an inclined surface composed of two vertical planes at the opposite sides of the right angled surface so inclined as to gradually spaced mutually with respect to the screw advancing direction following symmetrical advance toward said advancing direction.

12. An automatic screw feeding apparatus as claimed in any one of claims 1-7, wherein a hose attaching member is mounted to the under surface of the main body holding the screw dropping intercepting plate, the member includes a main body of generally rectangular block-like shape and hose fitting which are fitted concentrically corresponding to the screw passing holes of the main unit.

13. An automatic screw feeding apparatus as claimed in any one of claims 1-7 wherein for air passages there are formed an air inlet and a rising passage communicating therewith formed in the hose attaching member, an air vent extending through the intercepting plate, a rising passage, horizontal passages and falling passages formed in the main body, and falling passate formed in the hose attaching member for communication with the inside of the hose fittings.

* * * * *